United States Patent [19]

Maryonovich et al.

[11] 4,416,366
[45] Nov. 22, 1983

[54] EMERGENCY STOP MECHANISM

[75] Inventors: Michael Maryonovich, Whitefish Bay; Edward Ebey, Nashotah, both of Wis.

[73] Assignee: Masco Corporation, Taylor, Mich.

[21] Appl. No.: 242,687

[22] Filed: Mar. 11, 1981

Related U.S. Application Data

[63] Continuation-in-part of Ser. No. 201,507, Oct. 23, 1980, Pat. No. 4,359,207.

[51] Int. Cl.³ .............................................. B65G 41/00
[52] U.S. Cl. ........................................................ 198/320
[58] Field of Search ........................................ 198/320; 188/65.1–65.3; 187/22, 71, 81

[56] References Cited

U.S. PATENT DOCUMENTS

| 313,451 | 3/1885 | Rogers | 187/81 |
|---|---|---|---|
| 718,328 | 1/1903 | Donohoe | 187/81 |
| 1,043,323 | 11/1912 | Lester . | |
| 1,244,136 | 10/1917 | Segerdahl . | |
| 1,412,624 | 4/1922 | Lundgren . | |
| 2,489,632 | 11/1949 | Frieder | 188/65.1 X |
| 3,273,671 | 9/1966 | Vrana . | |
| 3,386,530 | 6/1968 | Thompson . | |
| 3,861,650 | 1/1975 | Jackson . | |
| 3,979,797 | 9/1976 | Stember . | |
| 4,000,805 | 1/1977 | Hadler | 198/320 |
| 4,106,753 | 8/1978 | Cavalieri et al. . | |

Primary Examiner—John J. Love
Assistant Examiner—Paul A. Sobel
Attorney, Agent, or Firm—Steven L. Permut; E. Dennis O'Connor; Leon E. Redman

[57] ABSTRACT

An emergency stop mechanism for a lifting device capable of moving a load along a predetermined path against and with the force of gravity using a winch-operated primary cable, and wherein the primary cable accomplishes a lifting function by pulling the load in the direction of increased potential energy. The emergency stop mechanism comprises a secondary cable suspended stationary and parallel to the path of movement of the load. A braking device fastened to the load is actuated by a decrease in tension in the primary cable below a predetermined minimum amount of tension and responds to such decrease by gripping the secondary cable.

9 Claims, 10 Drawing Figures

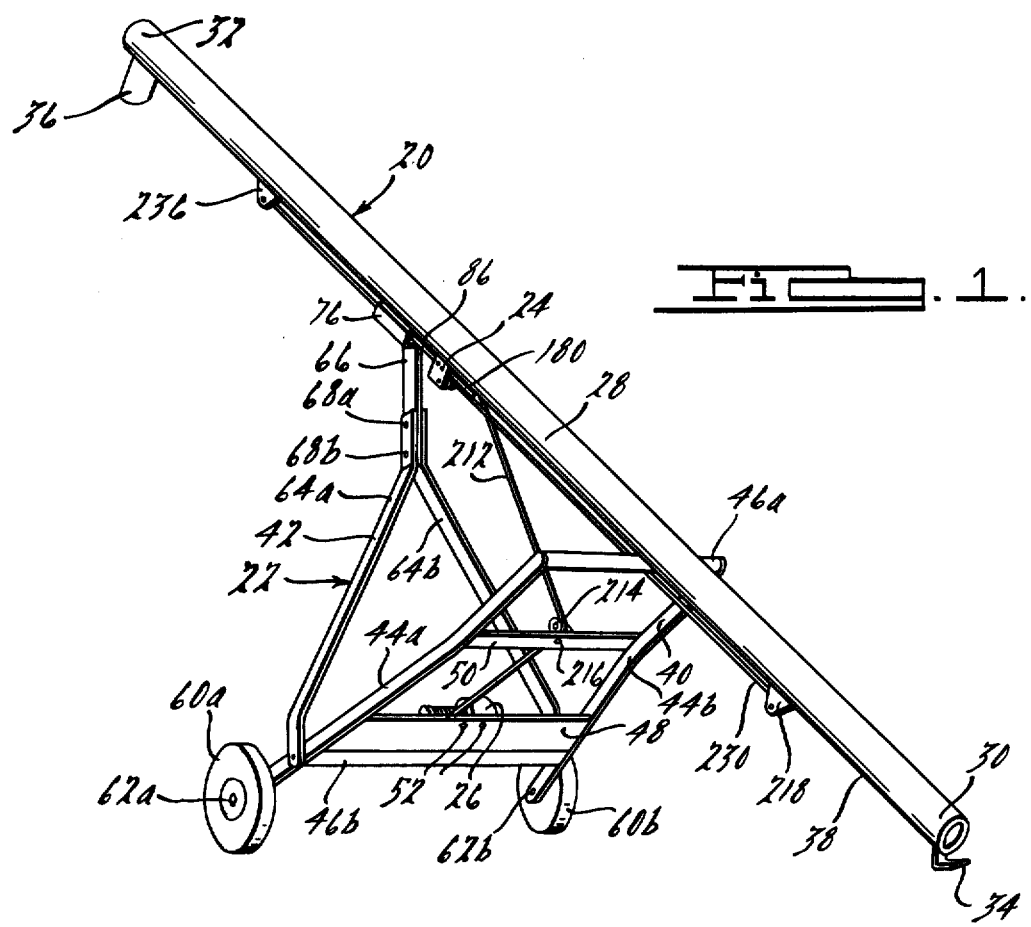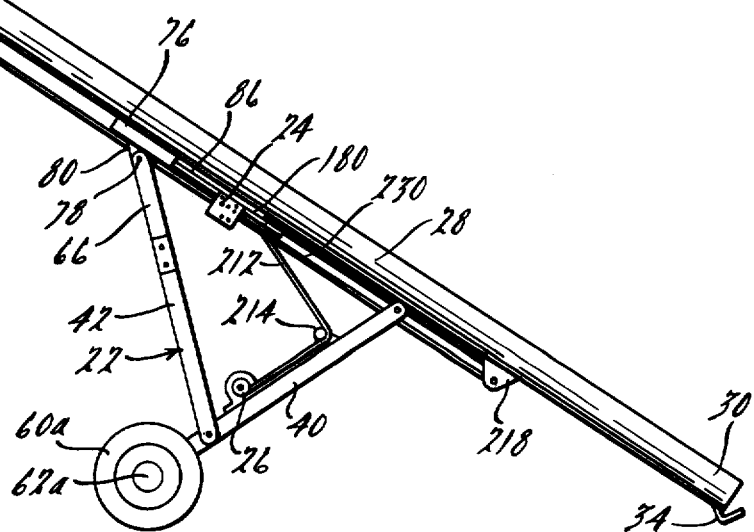

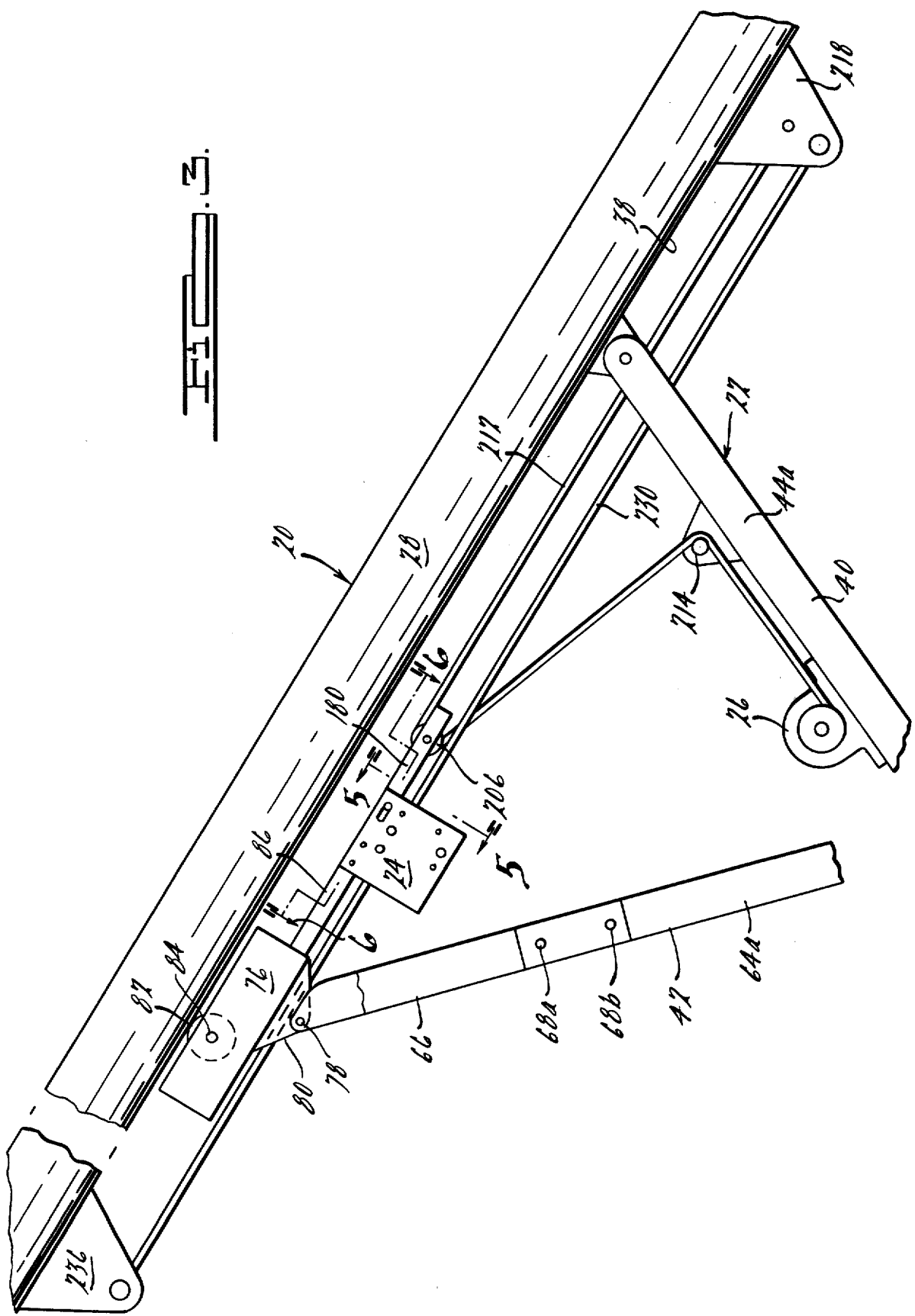

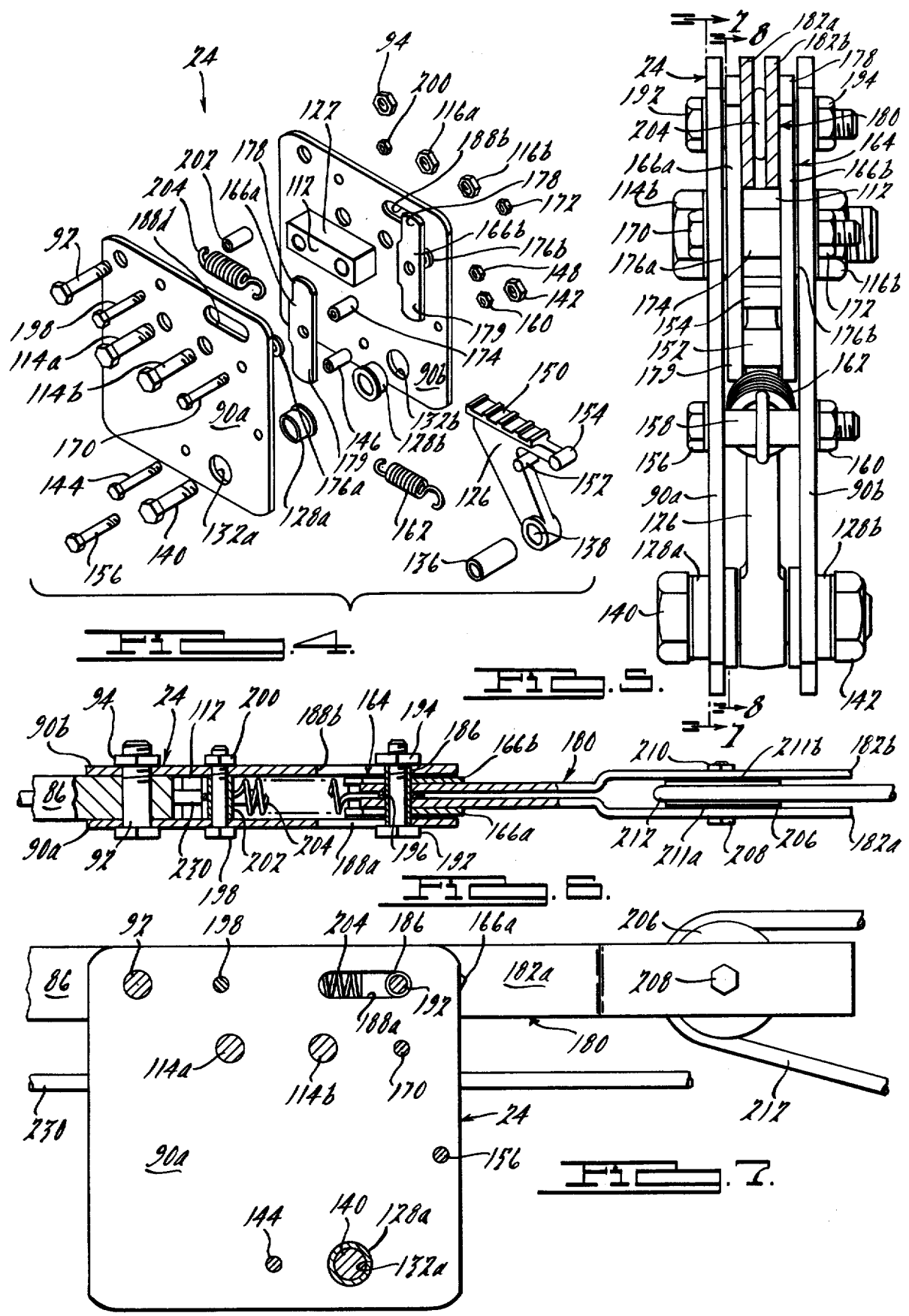

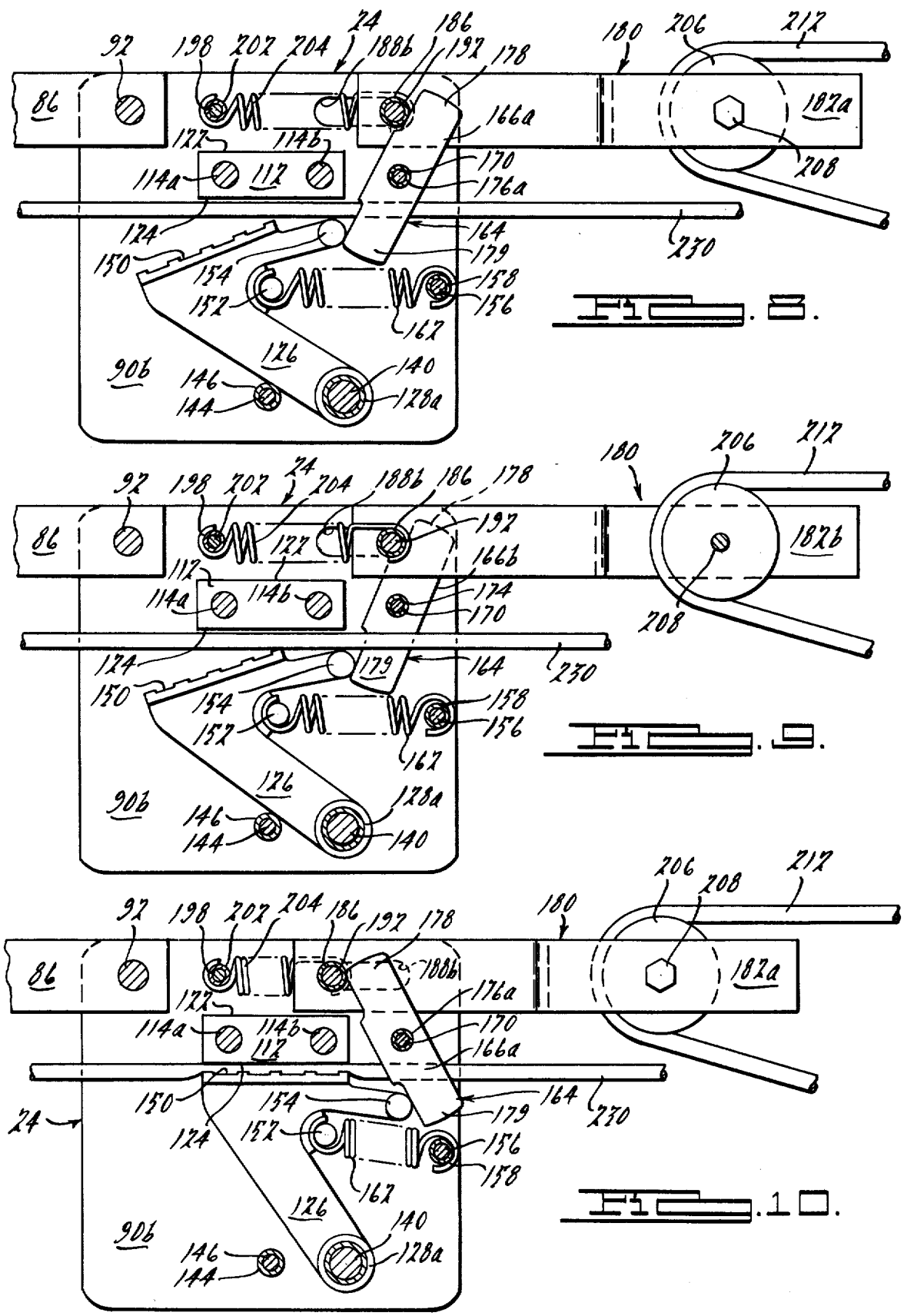

EMERGENCY STOP MECHANISM

CROSS REFERENCE TO RELATED APPLICATIONS

This application is a continuation-in-part of copending application Ser. No. 201,507 filed Oct. 23, 1980, now U.S. Pat. No. 4,359,207.

BACKGROUND OF THE PRESENT INVENTION

The present invention relates to safety devices for lifting mechanisms and more particularly to emergency stop mechanisms for lifting mechanisms using winch-powered cables or lines. Such lifting devices are well known and in common use in elevators, in dumbwaiters and in scissors mechanisms for raising industrial or agricultural equipment.

Such lifting mechanisms often consist of a winch-operated cable or line, a pulley system and a load bearing member. In the case of an elevator, the load bearing member is a vertically translating platform or is the payload itself. The load bearing member is a sliding trolley in the case of agricultural grain elevators or grain augers. Frequently, the failure of any component of the lifting mechanisms will result in a loss of tension in the cable and, therefore, in an absence of lifting force to counteract the force of gravity. The outcome of such a failure may be an undesired rapid downward movement of the payload.

Strengthening some of the individual components of the lifting mechanism may increase the reliable operation of the system and greatly reduce the chance of mechanical failure, but there are practical limitations of cost and size to such strengthening. Furthermore, the reliable operation of the lifting mechanism can be significantly affected only if all of its components are strengthened.

Providing two complete and redundant lifting mechanisms is another alternative, but is an extremely costly one. Furthermore, repeated use of the two lifting mechanisms places the same loads on the backup mechanism as on the primary mechanism and therefore causes similar wear on components of both mechanisms. When one of such mechanisms fails from age, misuse or faulty maintenance, the other mechanism will probably also be in a weakened state. The increased load suddenly placed on the surviving mechanism could cause it to fail also, thereby releasing the payload.

Many safety devices have been designed to prevent the free fall of the payload of lifting mechanisms in the event of such a failure. U.S. Pat. Nos. 1,043,323 (issued Nov. 5, 1912), 3,273,671 (issued Sept. 20, 1966) and 4,106,753 (issued Aug. 15, 1978), for example, disclose examples of safety mechanisms for elevators. In each of these examples there is a secondary cable and there is a clutch normally restrained by tension in the cable of the lifting mechanism. The clutch grips the secondary cable in the event of a drop in tension in the winding line. Each of these examples works well for the type of lifting mechanism for which it is designed, but is needlessly expensive and complex for many applications.

An object of the present invention, therefore, is to provide reliable safety device for use in cooperation with an active lifting mechanism, which device will secure the payload in a raised position in the event of a failure of the primary lifting system. It is also an object of the present invention to provide safety device of this type which is composed of relatively few components which are inexpensive to manufacture and assemble. Finally, it is an object of the present invention to provide a safety device of this type which is easy to disassemble for repair and maintenance.

SUMMARY

The present invention provides an inexpensive emergency stop mechanism for stopping or slowing the descent of a payload. The emergency stop mechanism is particularly useful with a lifting mechanism having a winch-operated primary cable wherein the primary cable accomplishes a lifting function by pulling the load in the direction of increased potential energy.

The emergency stop mechanism has a stationary jaw fastened to the load and a movable jaw movably fastened to the load. A safety cable is suspended parallel to the path of travel of the load and is anchored at each of its ends to a point beyond the end of the path. The safety cable passes between the jaws. A spring biases the movable jaw towards the stationary jaw to grip the safety cable therebetween and thereby to prohibit movement of the load relative to the safety cable. A retracting mechanism is fastened to the primary cable and is movably fastened to the load in a position adjacent to the movable jaw. In response to an amount of tension along the primary cable in excess of a predetermined minimum amount, the retracting mechanism biases the movable jaw away from the stationary jaw against the force of the spring. The tension along the primary cable is transmitted through the retracting mechanism to the load.

The predetermined minimum amount of tension is less than the amount of tension required to maintain the position of the load. Thus, in response to an amount of tension slightly above the predetermined amount of tension, the load moves slowly along the path to a position of lower potential energy.

BRIEF DESCRIPTION OF THE DRAWING

FIG. 1 is a perspective view of an agricultural grain auger having a lifting mechanism with an emergency stop mechanism according to the present invention;

FIG. 2 is a side elevational view of the grain auger of FIG. 1;

FIG. 3 is an enlarged partial side elevational view of the grain auger of FIG. 1 and shows a portion of the main body of the grain auger, the trolley, a portion of the lifting mechanism and the emergency stop mechanism thereof;

FIG. 4 is an exploded view of the emergency stop mechanism illustrated in FIG. 3;

FIGS. 5 and 6 are sectional views of the emergency stop mechanism taken along lines 5—5 and 6—6, respectively, of FIG. 3;

FIGS. 7 and 8 are sectional views taken along lines 7—7 and 8—8, respectively, of FIG. 5 and illustrate the emergency stop mechanism in the normal operating position;

FIG. 9 is a sectional view similar to FIG. 8 but with a few components of the emergency stop mechanism removed for clarity; and FIG. 10 is a sectional view similar to FIG. 8 but showing the emergency stop mechanism in the emergency position wherein the emergency stop mechanism is gripping the safety cable.

DETAILED DESCRIPTION OF THE PREFERRED EMBODIMENT

The many objects, advantages, and features of the present invention will become apparent to those skilled in the art when the following detailed description of the preferred embodiment is read together with the attached drawings.

Refer now to the drawings and particularly to FIGS. 1 through 3 thereof wherein an agricultural grain auger 20 having a lifting mechanism 22 and an emergency stop mechanism 24 according to the present invention is illustrated. The grain auger 20 and a winch 26 for the lifting mechanism 22 are both illustrated in the drawing and are both referred to in the following description of the preferred embodiment, but are elements well known in the art. Neither the grain auger 20 nor the winch 26 are claimed as part of the present invention. Therefore, neither has been illustrated or described in great detail. The present invention comprises the emergency stop mechanism 24 and the alteration of the lifting mechanism 22 to accommodate the emergency stop mechanism 24.

The agricultural grain auger 20 has a long cylindrical main body 28 with a longitudinal internal bore, not illustrated, extending therethrough. A long screw mechanism, not shown, is positioned within this bore. The screw mechanism is for delivering grain from the lower end 30 to the upper end 32 of the grain auger. A leg 34, illustrated in FIGS. 1 and 2, is mounted to the lower end 30 of the main body 28 to support the lower end of the main body on the ground. A spout 36 is formed at the upper end 32 of the main body 28 whereby the grain that is delivered by the screw mechanism to the upper end may be dropped into a grain bin, not shown.

The lifting mechanism 22 is provided on the underside 38 of the main body 28. The lifting mechanism 22 is provided so that the grain auger 20 may be stored and transported in a compact horizontal position. The lifting mechanism 22 also allows adjustment of the height of the spout 36, to a position that is a short distance above the top of the particular grain bin to be loaded.

The lifting mechanism 22 includes a scissors mechanism, best shown in FIG. 1. The scissors mechanism consists of two frames 40 and 42 which are pivotally fastened to each other, as is well known in the art. One of the frames, frame 40, is fastened to the auger and the other of the frames, frame 42, slides along the underside 38 of the main body 28. Frames 40 and 42 are described below in detail.

The frame 40 of the scissors mechanism has two identical side members 44a and 44b which are vertically disposed in a parallel and spaced apart relationship. The frame 40 also has two horizontally disposed tubular members, an upper member 46a and a lower member 46b. Each of the ends of the upper member 46a is fastened to the upper ends of one of the side members 44a and 44b. Each of the ends of the lower member 46b is fastened to one of the side members 44a and 44b near its lower end. A plate 48 is fastened to the side members 44a and 44b and to the lower member 46b. The winch 26 is fastened to the plate 48 by means of bolts 52. An additional cross member 50 extends horizontally between intermediate points of the side members 44a and 44b and are welded thereto to add rigidity to the frame 40. The frame 40 is pivotally connected at the midpoint of its upper member 46a to the underside 38 of the grain auger main body 28 by means well known in the art.

A pair of wheels 60a and 60b are provided to permit the frame 40 to move along the ground. Each of the wheels 60a and 60b is attached to the lower end of one of the side members 44a and 44b by means of a pin 62a or 62b.

The other frame of the scissors mechanism, frame 42, is an inverted "Y"-shaped member. The frame 42 has two vertical members 64a and 64b. Each of the members 64a and 64b is pivotally fastened to one of the side members 44a and 44b of the frame 40. The two members 64a and 64b extend from the side members 44a and 44b, respectively, and are bent so that they converge. Where they converge, they are fastened to each other and are fastened to the lower end of a third vertical member 66 by means of a pair of bolts 68a and 68b.

A trolley 76 is fastened to the upper end of the third vertical member 66 of the frame 42 by means of a bolt 78 (FIGS. 2 and 3) that passes through an aperture in the member 66 and through an aperture in an extension 80 of the trolley 76. A wheel 82 (FIG. 3) is secured to the trolley 76 by means of a stub shaft 84. The wheel 82 facilitates a rolling movement of the trolley 76 along the underside 38 of the grain auger main body 28.

As shown in FIG. 3, the emergency stop mechanism 24 is fastened to a horizontal extension 86 of the trolley 76. As shown in FIGS. 4, 5 and 6 the emergency stop mechanism 24 has a frame comprising two identical side plates 90a and 90b. The side plates 90a and 90b are sheet metal stampings and are disposed on either side of the extension 86 in a parallel and horizontally spaced apart relationship as best seen in FIG. 6. As shown in FIG. 6, the emergency stop mechanism 24 is fastened to the extension 86 by means of a bolt 92 passing through apertures in the side plates 90a and 90b and by means of a nut 94.

As illustrated in FIGS. 8, 9 and 10, a stationary jaw 112 is secured between the side plates 90a and 90b by a pair of bolts 114a and 114b and a pair of nuts 116a and 116b (FIG. 4). The stationary jaw 112 is a rectangular block having a flat upper surface 122 and a flat lower surface 124.

A movable jaw 126 is pivotally mounted between the side plates 90a and 90b in a position below the stationary jaw 112. As best illustrated in FIG. 4, a pair of bushings 128a and 128b are provided. Each bushing is inserted into an aperture 132a or 132b in one of the side plates 90a and 90b, respectively. A sleeve 136 passes through an aperture 138 in the jaw 126 and through the apertures in the bushings 128a and 128b. A bolt 140 and a nut 142 secure the sleeve 136 to the side plates 90a and 90b. The movable jaw 126 is thereby secured to the emergency stop mechanism 24 and is pivotable about the bolt 140, as shown in FIGS. 8 through 10.

A bolt 144, a sleeve 146, and a nut 148 (FIG. 4) are fastened between the side plates 90a and 90b, in a location to the left of the movable jaw 126 as illustrated in FIGS. 8 through 10. The sleeve 146 is provided as a spacer for the side plates 90a and 90b so that the side plates are not warped by the bolt 144 and the nut 148. The sleeve 146 acts as an abutment means preventing the movable jaw 126 from pivoting counterclockwise beyond a predetermined angular position.

The movable jaw 126 has a brake surface 150 pivotable to and away from the lower surface 124 of the stationary jaw 112. The function of the brake surface 150 will be discussed later in detail. The movable jaw 126 further has a pair of horizontal cylindrical extensions 152 and 154. The function of the extensions 152 and 154 is described below.

A bolt 156, a sleeve 158, and a nut 160 (FIG. 4) are fastened between the side plates 90a and 90b in a location to the right of the movable jaw 126 as illustrated in FIGS. 8 through 10. An extension coil spring 162 extends between the sleeve 158 and the extension 152 of the movable jaw. The spring 162 biases the movable jaw 126 in a clockwise direction and thereby biases the brake surface 150 of the movable jaw 126 towards the lower surface 124 of the stationary jaw 112.

A retracting mechanism 164, illustrated in FIG. 5 and FIGS. 8 through 10, is provided to drive the movable jaw 126 in a counterclockwise direction against the force of the spring 162. The retracting mechanism 164 includes two identical plates 166a and 166b (FIGS. 4 through 6) pivotally mounted between the side plates 90a and 90b by means of a bolt 170 and a nut 172. The bolt 170 is in the same horizontal plane as the bolts 114a and 114b of the stationary jaw 112 in the embodiment illustrated, as shown in FIG. 7. As shown in FIGS. 4, 6, and 9, a sleeve 174 is provided between the plates 166a and 166b of the retracting mechanism 164 to keep them separated. A washer 176a (FIGS. 5, 8 and 10) is provided between the plate 166a and the side plate 90a and a similar washer 176b (FIG. 5) is provided between the plate 166b and the side plate 90b. The washers 176a and 176b facilitate pivotal movement of the retracting mechanism 164 about the sleeve 174 with respect to the side plates 90a and 90b.

Each of the plates 166a and 166b of the retracting mechanism 164 is a stamping having an upper arm 178 and a lower arm 179, each of the arms 178 and 179 extending radially from the portion of the plate that is near the bolt 170. The lower arm 179 of each of the plates 166a and 166b is in contact with the extension 154 of the movable jaw 126, as shown in FIGS. 9 and 10. The upper arm 178 is in contact with the pulley assembly 180, described below.

As shown in FIGS. 5 and 6, the pulley assembly 180 is partly disposed between the side plates 90a and 90b of the emergency stop mechanism 24. The pulley assembly 180 has two identical flat rectangular plates 182a and 182b. The plates 182a and 182b are parallel to each other and are horizontally spaced apart. Each of the plates 182a and 182b have portions that are disposed between the upper arms 178 of the lever plates 166a and 166b.

The pulley assembly 180 is slidably secured to the emergency stop mechanism 24 by means of a sleeve 186 in a manner best shown in FIG. 6. The sleeve 186 passes through each of a pair of slots 188a and 188b in the side plates 90a and 90b, respectively. A bolt 192 and a nut 194 are provided to prevent removal of the sleeve 186 from the slots 188a and 188b. The sleeve 186 also passes through apertures in each of the pulley assembly plates 182a and 182b. Each of the plates 166a and 166b of the retracting mechanism 164 has its upper arm 178 in contact with the outer surface of the sleeve 186. A large diameter sleeve 196 is provided over the sleeve 186 between the retracting mechanism plates 182a and 182b to maintain a desired spacing therebetween.

A bolt 198, a nut 200, and a sleeve 202, shown in FIGS. 4 and 6 of the drawing, are provided between the side plates in the same horizontal plane as the sleeve 186. An extension coil spring 204 extends between the sleeve 196 and the sleeve 202. The spring 204 biases the sleeve 196, and thereby biases the pulley assembly 180, to the left as viewed in FIGS. 7 through 9. Furthermore, the spring 204 biases the sleeve 186 away from the upper arm 178 of the retracting mechanism plates 166a and 166b.

As shown in FIGS. 1 through 3 and FIGS. 5 through 10, a portion of the pulley assembly 180 extends to the right beyond the side plates 90a and 90b of the emergency stop mechanism 24. As best illustrated in FIG. 6, a pulley 206 is fastened between the pulley assembly plates 182a and 182b by means of a bolt 208 and a nut 210. A pair of washers 211a and 211b are provided between the pulley 206 and each of the plates 182a and 182b to facilitate rotation of the pulley. The primary cable 212 which is supplied by the winch 26, as described below, is wound half a turn about the pulley 206 and biases the pulley assembly 180 to the right in a manner that will become apparent shortly.

Returning to FIGS. 1 through 3, the winch 26 supplies the primary cable 212. The cable extends from the winch 26 to and about a pulley 214 mounted on the cross member 50 of the frame 40 by means of a bolt 216. The cable 212 extends from the pulley 214 to and about the pulley 206 described in the previous paragraph. The cable 212 extends from the pulley 206 to an anchor 218 mounted to the underside 38 of the grain auger main body 28 near the lower end 30 of the main body 28.

It should be noted here that in conventional prior art grain auger lifting mechanisms, the primary cable 212 extends from the pulley 214 to the trolley 76 and is fastened thereto. Alternatively, the primary cable 212 leads to the pulley 206 which is itself fastened directly to the trolley 76. Thus, in the preferred embodiment of the present invention as described above, the emergency stop mechanism 24 has been added so as to be functionally in series with the primary lifting system.

A safety cable 230 is provided on the underside 38 of the grain auger main body 28. One of the ends of the safety cable 230 is tied to the anchor 218. The other end of the safety cable 230 is tied to an anchor 236 which is fastened to the underside 38 of the grain auger main body 28 near the upper end 32 of the main body 28. The safety cable 230 is taut and extends parallel to the main body 28 between the two anchors 218 and 236, as depicted in FIGS. 7 through 10.

In operation, the force of gravity urges the grain auger 20 towards a position of lower potential energy. Thus, the weight of grain auger main body 28 tends to urge the trolley 76 upwardly along the underside 38 of the grain auger main body 28. The upper end 32 of the grain auger main body 28 may therefore be raised by operating the winch 26 to retrieve the primary cable 212, thereby pulling the trolley 76 downwardly along the underside 38 of the auger main body 28 and drawing the two frames 40 and 42 together. If an emergency stop mechanism 24 is not provided, the failure of the winch 26, the pulley 214 or the cable 212, or the failure of any of the fasteners securing any of these components to the grain auger 20, would result in an absence of any force counteracting gravity. Thus, upon such a failure, the grain auger main body 28 would descent in an undesirable sudden movement. The emergency stop mechanism 24 is provided to prevent this sudden downward movement.

During normal operation, as illustrated in FIG. 8, the tension in the primary cable 212 is sufficient to counteract the combined force of two extension springs 162 and 204 on the retracting mechanism 164 and therefore to bias the movable jaw 126 away from the stationary jaw 112. In normal operation, therefore, the jaws 112 and 126 move freely past the safety cable 230. The tension of the primary cable 212 is transmitted through the pulley assembly 180 to the sleeve 186. The sleeve 186 transmits this force to the metal at the edges of the slots 188a and 188b and thus indirectly transmits the tension force of the primary cable 212 to the trolley 76. Depending on the amount of tension in the primary cable 212 the trolley 76 will travel up or down along the underside 38 of the grain auger main body 28 or will remain stationary. Thus, the emergency stop mechanism 24 does not alter the response of the lifting mechanism 22 to the primary cable 212 during normal operation of the lifting mechanism 22.

The emergency stop mechanism of the present invention operates by taking advantage of the fact that the failure of certain components of the lifting mechanism 22 results in a decrease in tension in the primary cable 212. If the tension along the primary cable 212 decreases below a certain predetermined minimum level, there will be a net force on the pulley assembly 180 in the direction of the trolley 76. As shown in FIG. 4, if the tension drops below that predetermined minimum level, the extension spring 204 pulls the sleeve 186 and the pulley assembly 180 away from the upper arms 178 of the retracting mechanism 164. The pulley assembly 180 moves past the top surface of the stationary jaw 112. The movement of the sleeve 186 away from the upper arms 178 of the retracting mechanism 164 permits the spring 162 to pull the movable jaw 126 clockwise. The secondary cable 230 is gripped between the lower surface 124 of the stationary jaw 112 and the brake surface 150 of the movable jaw 126. The trolley 76 is thereby prevented from moving with respect to the secondary cable 230.

The foregoing detailed description represents the best mode contemplated at the time of filing for carrying out the present invention. From the foregoing it is apparent that the present invention provides an inexpensive safety device cooperating with an active lifting mechanism. The safety device secures the payload in its raised position in the event of a failure of the primary lifting mechanism. The safety device of the present invention sustains minimal loads and thus minimal wear during normal operation. The safety device is comprised of relatively few components that are inexpensive to manufacture and assemble. The safety device is furthermore easy to disassemble for service and maintenance. Finally, the safety device is universal in design so that it may be easily adapted to various lifting mechanisms.

Other variations not departing from the spirit of the above-described invention will be apparent to those skilled in the art. For example, the primary cable and the secondary cable may, depending on the application, comprise any type of line, rope, chord, twine, string, or chain of appropriate strength. Furthermore, the emergency stop mechanism of the present invention may be used with other types of lifting mechanisms, such as dumbwaiters, platform elevators, portable and stationary grain augers, and portable and stationary chain and flight elevators. These and other variations can be carried out without departing from the scope of the invention which is intended to be limited only by the scope of the appended claims.

What is claimed as novel is as follows:

1. A grain handling apparatus including an elongated carrier, and a lifting device for raising one end of said carrier, said lifting device including a trolley upon which said carrier partly rests, a first and second link pivotally connected together, said first link being fastened to said carrier, said second link being connected to said trolley, a primary cable and reel means operative to play out and take up said cable, said cable being fastened to said trolley and exerting a force on said trolley along a path on the underside of said carrier in a direction of increased potential energy upon being taken up by said reel, and a stop mechanism, said stop mechanism comprising:

a secondary cable fastened at each of its ends to said carrier at fastening points beyond said path and extended parallel to said path;
   a stationary jaw fixedly fastened to said carrier and disposed adjacent said secondary cable;
   a movable jaw movably fastened to said trolley such that said movable jaw is selectively movable into contact with said secondary cable to grip said secondary cable between said jaws and thereby prohibits motion of said carrier along said path;
   biasing means biasing said movable jaw towards said secondary cable and said stationary jaw;
   retracting means fastened to said primary cable and movably fastened to said trolley;
   said retracting means includes a lever pivotably connected to said trolley with one end in engagement with a stop means fastened to said primary cable;
   said lever having a second end in engagement with said movable jaw;
   said retracting means constructed to respond to the magnitude of tension along said primary cable with said tension being transmitted to said stop means, said lever, said movable jaw, and said biasing means such that said retracting means has its lever pivoted to a first position and moves said movable jaw away from said secondary cable against the force of said biasing means when an amount of tension is in excess of a predetermined minimum value, said biasing means moving said movable jaw to grip said, secondary cable and pivoting said lever to a second position upon a decrease in tension in said primary cable below said predetermined minimum, and said lever again retracting said movable jaw upon a later increase in tension above said predetermined minimum, said predetermined minimum amount of tension being less than the amount of tension in said line required to maintain the position of said trolley.

2. The emergency stop mechanism of claim 1 further comprising a frame fastened to said load wherein said jaws and said retracting means are fastened to said frame and wherein said safety cable passes through said frame between said jaws.

3. The emergency stop mechanism of claim 2 wherein said frame comprises two identical flat plates secured together in a parallel and spaced apart relationship, wherein said stationary jaw is fixedly fastened between said plates, and wherein said movable jaw and said lever of said retracting means are both pivotally fastened between said plates.

4. The emergency stop mechanism of claim 2 wherein said frame further comprises abutment means for said retracting means such that, in response to an amount of tension in excess of said predetermined minimum amount, said stop means of said retracting means moves until it encounters said abutment means and thereafter transmits said tension to said frame through said abutment means.

5. The emergency stop mechansim of claim 1 wherein said emergency stop mechansim further comprises a second abutment means for said movable jaw, said second abutment means stopping the motion of said movable jaw and the motion of said retracting means in response to the force of said biasing means when tension in said primary cable is less than said predetermined minimum amount.

6. A grain handling apparatus including an elongated carrier, and a lifting device for raising one end of said carrier, said lifting device including a trolley upon which said carrier partly rests, a first and second link pivotally connected together, said first link being fastened to said carrier, said second link being connected to said trolley, a primary cable and reel means operative to play out and take up said cable, said cable being fastened to said trolley and exerting a force on said trolley along a path on the underside of said carrier in a direction of increased potential energy upon being taken up by said reel, and a stop mechanism, said stop mechanism comprising:
- a secondary cable fastened at each of its ends to said carrier at fastening points beyond said path and extending parallel to said path;
- a frame fastened to said trolley with said secondary cable passing through said frame;
- a staionary jaw fixedly fastened to said frame and disposed adjacent to said secondary cable;
- a movable jaw fastened to said frame such that said movable jaw selectively pivots into contact with said secondary cable to grip said secondary cable between said jaws and thereby prohibits motion of said carrier along said path;
- a spring biasing said movable jaw towards said secondary cable and against said stationary jaw;
- a sliding member slidably fastened to said frame and fastened to said primary cable;
- abutment means for said sliding member such that, when said sliding member is in contact with said abutment means, tension in said line is transmitted to said frame; and
- a retracting lever pivotally fastened to said frame and having one end in contact with said movable jaw and a second end in contact with said sliding member;
- said retracting lever constructed to respond to the magnitude of tension along said primary cable with said tension biasing said sliding member toward said abutment means and against said retracting lever and said retracting lever pivoting to move said movable jaw away from said secondary cable when an amount of tension is in excess of a predetermined minimum value, said force exerted by said spring exceeding said tension in said primary cable and said spring biasing said movable jaw against said stationary jaw and said secondary cable upon a decrease in tension below predetermined minimum value, said predetermined minimum value of tension being less than the amount of tension in said primary cable required to maintain the position of said trolley.

7. The emergency stop mechanism of claim 6 wherein said frame further comprises a second abutment means for said moveable jaw, said second abutment means stopping the motion of said moveable jaw and the motion of said retracting lever in response to tension in said primary cable less than said predetermined minimum amount.

8. The emergency stop mechanism of claim 1 further comprising a spring fastened at one of its ends to said frame and fastened at the other of its ends to said sliding member, said latter spring acting in parallel with said former spring against said tension in said primary cable.

9. The emergency stop mechanism of claim 1 wherein said sliding member comprises a rod and wherein said rod slides along a slot in said frame, said abutment means consisting of one edge of said slot.

* * * * *